United States Patent
McGuire et al.

(10) Patent No.: US 6,247,569 B1
(45) Date of Patent: Jun. 19, 2001

(54) WRAP SPRING CLUTCH

(75) Inventors: David Michael McGuire, Birch Run; David Lynn Ehle, Lapeer, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/464,027

(22) Filed: Dec. 15, 1999

(51) Int. Cl.[7] ..................... F16D 13/08
(52) U.S. Cl. .......... 192/84.81; 192/35; 192/81 C
(58) Field of Search ............... 192/84.81, 35, 192/81 C, 12 BA

(56) References Cited

U.S. PATENT DOCUMENTS

| 4,846,324 | * | 7/1989 | Ohsawa | 192/35 |
| 5,099,974 | * | 3/1992 | Spechko | 192/35 X |
| 5,127,502 | * | 7/1992 | Billings | 192/35 |

* cited by examiner

*Primary Examiner*—Charles Marmor
*Assistant Examiner*—Saul Rodriguez
(74) *Attorney, Agent, or Firm*—Vincent A. Cichosz

(57) ABSTRACT

A wrap spring clutch (10) including an input side rotating member (12), an output side rotating member (14), a pole piece (16) containing a cylindrical center bore (18), a coil spring (20) having a first end (22), a second end (24), an outer diameter (24A) and an inner diameter (24B), an end frame (26) and a switch element (28). The cylindrical center bore (18) maintains the outer diameter (24A) of the coil spring (20) thereby minimizing variations in the performance of the wrap spring clutch (10) and reducing the cost and difficulties associated with the manufacture and assembly of known designs.

9 Claims, 1 Drawing Sheet

WRAP SPRING CLUTCH

TECHNICAL FIELD

The present invention relates generally to a wrap spring clutch and more particularly to improvements in the design of a wrap spring clutch to reduce cost and improve consistency of clutch assembly and performance.

BACKGROUND OF THE INVENTION

Wrap spring clutches are well known in a variety of forms and are used in a variety of applications. The basic operation of many wrap spring clutch designs involves utilizing a spring coil surrounding two shafts to transfer torque from one shaft to the other. Commonly the spring coil is fixed on one end to one of the shafts. When the clutch is activated, the unfixed end of the coil spring attaches to the other shaft and spins until the spring is wrapped down onto both shafts and torque is then transmitted from one shaft to the other. The clutch may be activated by various methods, including the use of an electromechanical switch.

It is known that the time between the activation of the clutch and the binding of the spring in these designs is dependent upon the distance between the inner surface of the spring coil and the shafts. Variations in the diameter of the spring coil can result in undesirable variations in the wrap spring clutch performance. In order to prevent these variations, it is known that the spring coil may be manufactured to tight tolerances. While manufacturing the spring coil to tight tolerances does improve the wrap spring clutch performance, it adds undesirable cost to the wrap spring clutch. It is also known that the inner diameter of the spring coil can be bored out after manufacture to minimize variations. This not only adds additional cost to the manufacture of the wrap spring clutch but it adds additional manufacturing steps as well. It would be highly desirable to be able to reduce the variation in wrap spring clutch performance without the costs associated with improved spring coil manufacturing.

Variations in spring coil diameter can lead to other manufacturing difficulties in wrap spring clutch production. Variations in spring coil diameter can result in variations in the position of the end tabs of the spring coil. Variation in end tab positions makes assembly of the wrap spring clutch difficult and costly. Variation in end tab position may be minimized by manufacturing the spring coil to tight tolerances. Tight tolerances, however, are undesirable since they add to the manufacturing cost of the wrap spring clutch. One known method of compensating for variations in end tab placement, is by manufacturing multiple attachment locations for the spring coil within the clutch assembly. This is a costly and undesirable solution. It would be desirable to have a design that reduced the variation in end tab placement such that design and assembly of the wrap spring clutch was simplified and costs were reduced.

The wrap spring clutch is a highly desirable design for use in many applications. The wrap spring clutch allows smooth engagement and has quick release properties that provide a valuable safety mechanism when used in applications such as automotive cruise control. A design is therefore needed that retains the positive characteristics of the wrap spring clutch while eliminating the deficiencies in manufacturing, cost, assembly, and performance associated with known designs.

SUMMARY OF THE INVENTION

It is therefore an object of the present invention to provide a wrap spring clutch that retains the positive characteristics of known wrap spring clutches while reducing the deficiencies in manufacturing, cost, assembly, and performance associated with known designs.

In accordance with the objects of this invention, a wrap spring clutch is provided. The wrap spring clutch includes an input side rotating member and an output side rotating member. The wrap spring clutch includes a pole piece with a cylindrical center bore which houses a coil spring. One end of the coil spring is attached to the output side rotating member and the other end is attached to the pole piece. The input side rotating member and the output side rotating member pass through the center axis of the coil spring. A endframe is attached to input side rotating member and surrounds the pole piece and coil spring.

An excitation coil is magnetically coupled to the pole piece. When the clutch is activated, a current is passed through the excitation coil and a magnetic field is produced around the pole piece. The pole piece becomes magnetically attached to the endframe and begins rotating with the input side rotating member. As the pole piece begins to rotate, the coil spring begins to wind down onto the input side rotating member and the output side rotating member. When the coil spring tightens, the torque of the input side rotating member is transferred to the output side rotating member.

The outer diameter of the coil spring is equal to or greater than the diameter of the cylindrical center bore in the pole piece. In this way, the cylindrical center bore controls the diameter of the coil spring. The diameter of the coil spring is therefore controlled without the need for complex coil spring machining.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
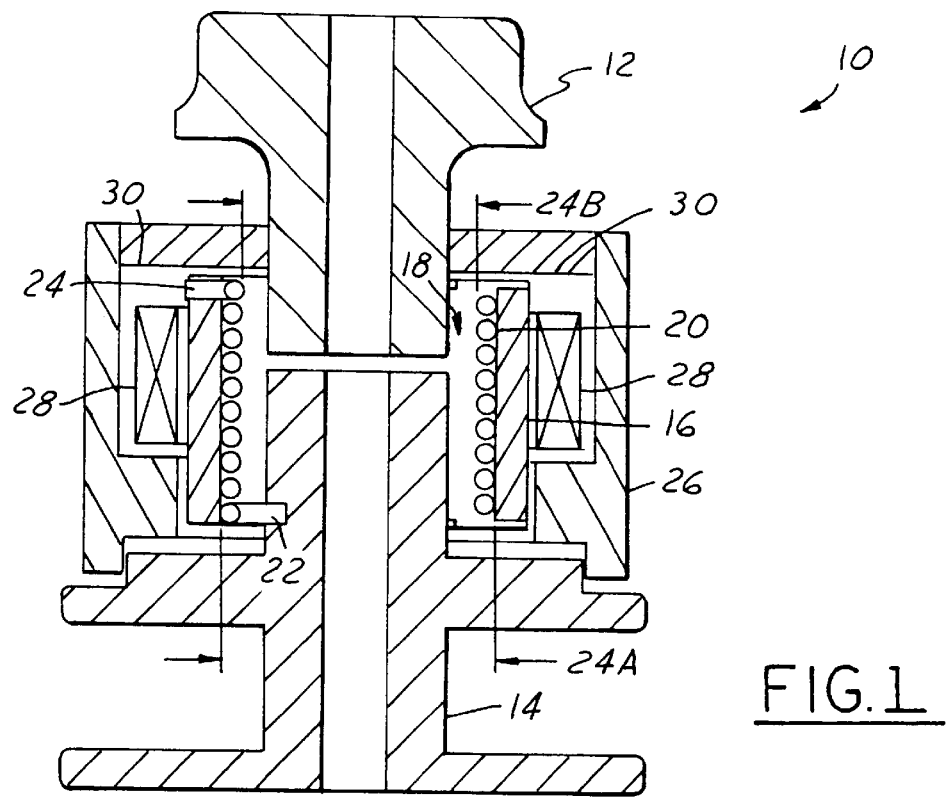
FIG. 1 is a cross-sectional view of one preferred embodiment of a wrap spring clutch in accordance with the present invention.

Referring now to FIG. 1, which is a cross-sectional view of a wrap spring clutch 10 in accordance with the present invention. The disclosed wrap spring clutch 10 is preferably for use in a automotive cruise control application. However, the disclosed wrap spring clutch 10 may be used in a variety of other applications.

The wrap spring clutch 10 comprises an input side rotating member 12 and an output side rotating member 14. The input side rotating member 12 and the output side rotating member 14 members are positioned along a similar axis but remain unattached to each other while the wrap spring clutch 10 is inactive. The input side rotating member 12 receives torque from a drive source outside of the wrap spring clutch 10. The output side rotating member 14 is attached to a driven source outside the wrap spring clutch 10. In one embodiment for use in automotive cruise control systems, the input side rotating member 12 is attached to an electric motor and the output side rotating member 14 is attached to a throttle control.

The wrap spring clutch 10 includes a pole piece 16 having a cylindrical center bore 18. A coil spring 20 is located within the cylindrical center bore 18. The input side rotating member 12 and the output side rotating member 14 are positioned along a center axis of the cylindrical center bore 18 and the coil spring 20. The spring coil 20 is comprised of a first end 22 and a second end 24. The first end 22 is attached to the output side rotating member 14. The second end 24 is attached to the pole piece 16.

The coil spring 20 has an outer diameter 24A and an inner diameter 24B. The outer diameter 24A is preferably equal to or greater than the diameter of the cylindrical center bore 18. This forces the outer diameter 24A to remain precisely at the dimensions of the cylindrical center bore 18 while the coil spring 20 is at rest inside the cylindrical center bore 18. When the outer diameter 24A is held to a precise dimension, variations in the inner diameter 24B are minimized. This allows the coil spring 20 to be produced inexpensively while achieving the precise inner diameter 24B dimensions previously only achieved through expensive tight tolerance spring manufacturing or through additional machining. In addition, by achieving a precise outer diameter 24A, variations in the positions of the first end 22 and the second end 24 are minimized. This reduces the cost, design and assembly difficulties associated with known designs.

Figure 2:
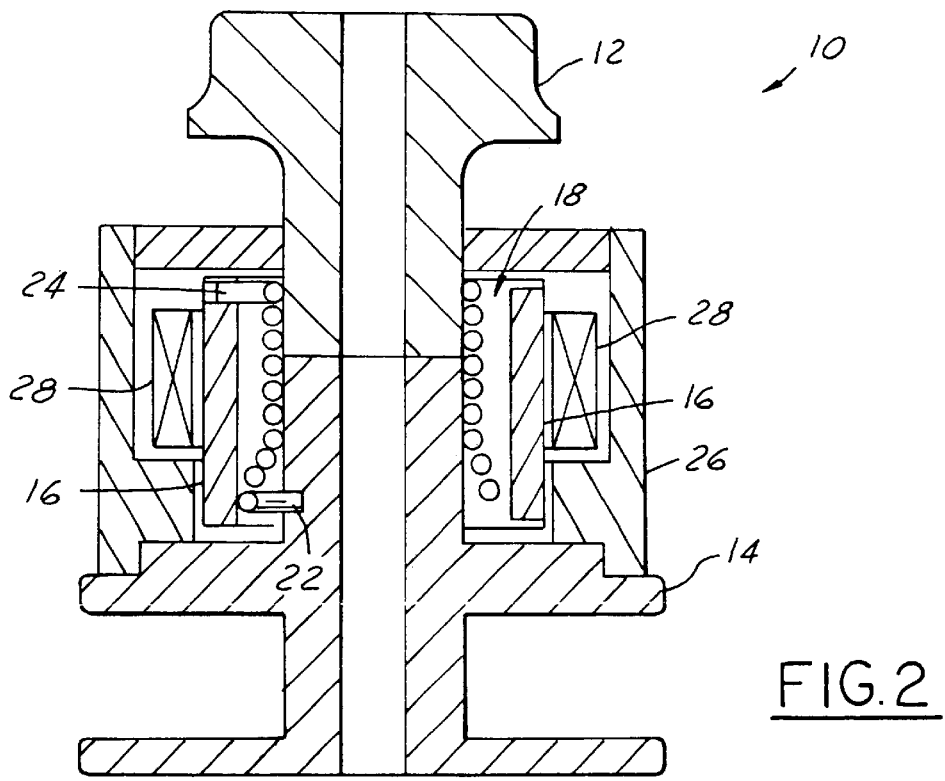
FIG. 2 is a cross-sectional view of one preferred embodiment of a wrap spring clutch in accordance with the present invention, the wrap spring clutch shown in the activated position.

The wrap spring clutch 10 includes an end frame 26 attached to the input side rotating member 12. In one embodiment, the end frame 26 may be used to properly position the pole piece 16 and the coil spring 20 about the input side rotating member 12 and the output side rotating member 14. Although the end frame 26 is described as a separate element, it should be understood that the input side rotating element 12 and the end frame 26 may be formed as a single element The wrap spring clutch 10 further includes a switch element 28. In one embodiment, the switch element 28 is attached to the pole piece 16. In other embodiments, the switch element 28 may be attached to the end frame 26. The switch element 28 comprises an active position (seen in FIG. 2) and an inactive position. In the active position, the pole piece 16 becomes attached to the end frame 26 and rotates with the input side rotating member 12. As the pole piece 16 rotates with the input side rotating member 12, the coil spring 20 wraps down on both the input side rotating member 12 and the output side rotating member 14, thereby transferring torque from the input side rotating member 12 to the output side rotating member 14. Since the coil spring 20 outer diameter 24A is precisely controlled by the cylindrical center bore 18, variations in the distance between the inner diameter 24B and the input side rotating member 12 and the output side rotating member 14 are also reduced. By reducing variations in the distance between the inner diameter 24B and input side rotating member 12 and the output side rotating member 14, variations in wrapdown time are reduced.

In one embodiment, the switch element 28 comprises an excitation coil which when active causes the pole piece 16 to become magnetically attached to the end frame 26. In this embodiment the end frame 26 contains a ferrous surface 30 which becomes magnetically attached to the pole piece 16 when the clutch is active. Although the switch element 18 has been described as an electromechanical switch, the switch may be formed in a variety of methods known in the art. In addition, although the present embodiment refers to an input side rotating member 12 and an output side rotating member 14, it should be understood that either member may be designated as input or output.

In operation when the switch element 28 is activated a current is passed through the excitation coil. This creates a magnetic field in which the pole piece 16 becomes magnetically attached to the ferrous surface 30 of the end frame 26. Since the end frame 26 is attached to and receiving rotational drive from the input side rotating member 12, the rotational drive is transferred to the pole piece 16. Since the first end 22 of the coil spring 20 is attached to the output side rotating member 14 and the second end 24 is attached to the pole piece 16, as the pole piece rotates the coil spring 20 begins to wrap down on both the input side rotating member 12 and the output side rotating member 14. As the coil spring 20 becomes wrapped on the surface of the input side rotating member 12 and the output side rotating member 14, the torque from the input side rotating member 12 is transferred to the output side rotating member 14. Since variations in distance between the inner diameter 24B and the input side rotating member 12 and output side rotating member 14 have been minimized, variations in the time required for the coil spring 20 to wrap down and torque to be transferred are minimized.

While particular embodiments of the invention have been shown and described, numerous variations and alternate embodiments will occur to those skilled in the art. Accordingly, it is intended that the invention be limited only in terms of the appended claims.

What is claimed is:

1. A wrap spring clutch comprising:

an input side rotating member;

an output side rotating member;

a pole piece having a cylindrical center bore;

a coil spring having a first end attached to said output side rotating member and a second end attached to said pole piece, said coil spring having an outer diameter that is greater than the diameter of said cylindrical center bore;

an endframe attached to said input side rotating member; and a switch element that can be actuated between an active position wherein said pole piece becomes temporarily attached to said endframe and an inactive position wherein said pole piece remains detached from said endframe.

2. A wrap spring clutch as described in claim 1, wherein said input side rotating member and said endframe are formed as a single element.

3. A wrap spring clutch comprising:

an input side rotating member;

an output side rotating member;

a pole piece comprising a ferrous material having a cylindrical center bore;

a coil spring having a first end attached to said output side rotating member and a second end attached to said pole piece, said coil spring having an outer diameter that is equal to or greater than the diameter of said cylindrical center bore;

an endframe comprising a ferrous surface attached to said input side rotating member;

an excitation coil that can be actuated between an active position wherein said pole piece becomes temporarily attached to said endframe and an inactive position wherein said pole piece remains detached from said endframe;

wherein when said excitation coil is in said active position, a magnetic field is induced; and wherein said magnetic field attaches said pole piece to said ferrous surface on said endframe.

4. A wrap spring clutch as described in claim 3, wherein said excitation coil is attached to said pole piece.

5. A wrap spring clutch as described in claim 3, wherein said excitation coil is attached to said endframe.

6. A wrap spring clutch comprising:

an input side rotating member;

an output side rotating member;

a pole piece having a cylindrical center bore;

a coil spring comprising a first end attached to said input side rotating member and a second end attached to said pole piece, said coil spring having an outer diameter that is greater than the diameter of said cylindrical center bore;

an endframe attached to said output side rotating member; and a switch element that can be actuated between an active position wherein said pole piece becomes temporarily attached to said endframe and an inactive position wherein said pole piece remains detached from said endframe.

7. A wrap spring clutch as described in claim 6, wherein said output side rotating member and said endframe are formed as a single element.

8. A wrap spring clutch comprising:

an input side rotating member;

an output side rotating member;

a pole piece comprising a ferrous material having a cylindrical center bore;

a coil spring comprising a fist end attached to said input side rotating member and a second end attached to said pole piece, said coil spring having an outer diameter that is equal to or greater than he diameter of said cylindrical center bore;

an endframe comprising a ferrous surface attached to said output side rotating member;

an excitation coil that can be actuated between an active position wherein said pole piece becomes temporarily attached to said endframe and an inactive position wherein said pole piece remains detached from said endframe;

wherein when said excitation coil is in said active position, a magnetic field is induced; and wherein said magnetic field attaches said pole piece to said ferrous surface on said endframe.

9. A wrap spring clutch as described in claim 8, wherein said excitation coil is attached to said endframe.

* * * * *